No. 649,176. Patented May 8, 1900.
W. W. RATHBUN.
WHEEL.
(Application filed Apr. 27, 1898.)
(No Model.) 2 Sheets—Sheet 1.
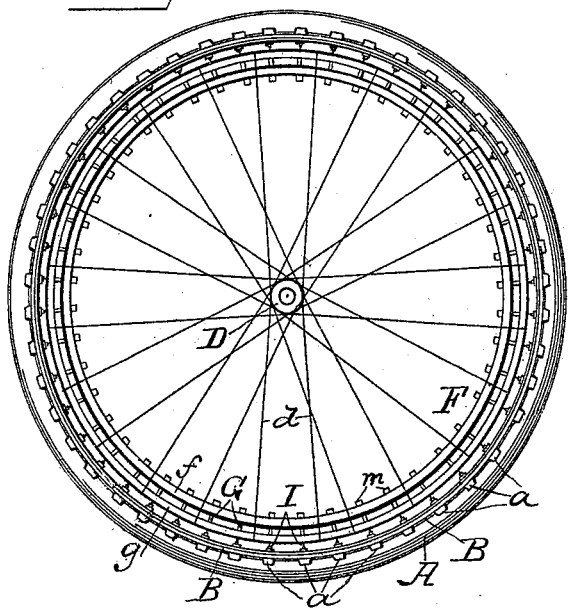
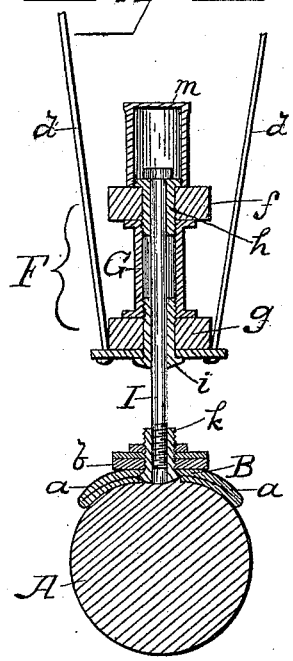
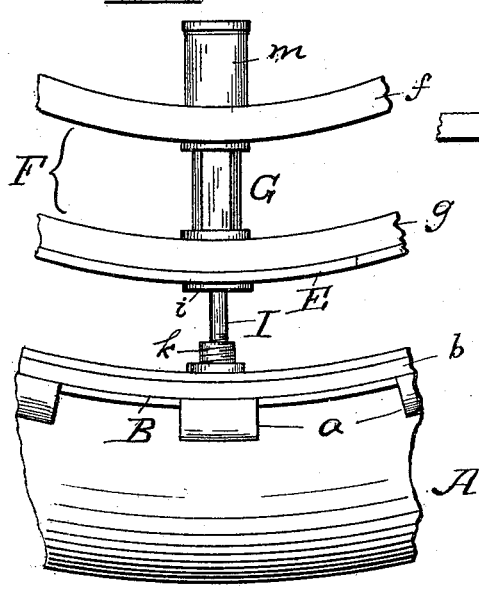
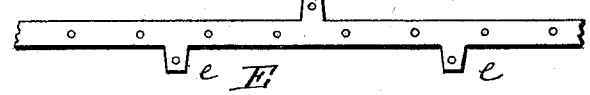
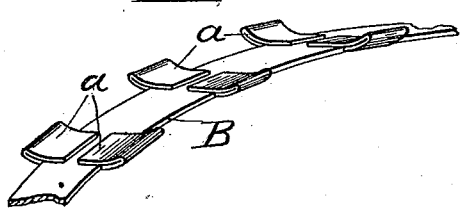
Witnesses: Inventor:
William W. Rathbun
By Frank D. Thomason
Atty No. 649,176. Patented May 8, 1900.
W. W. RATHBUN.
WHEEL.
(Application filed Apr. 27, 1898.)
(No Model.) 2 Sheets—Sheet 2.
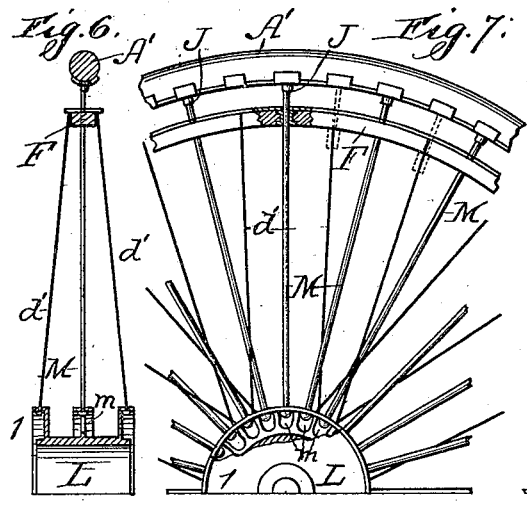
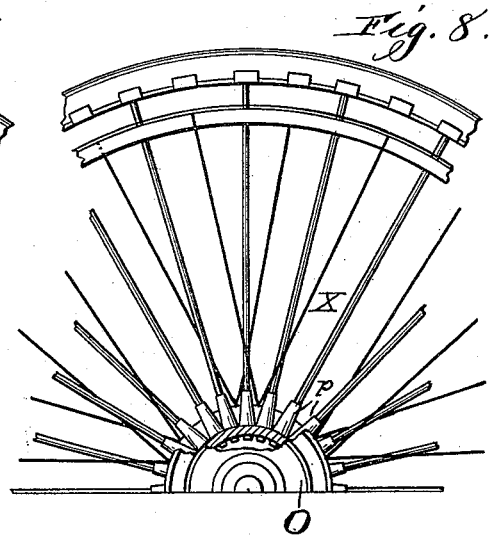
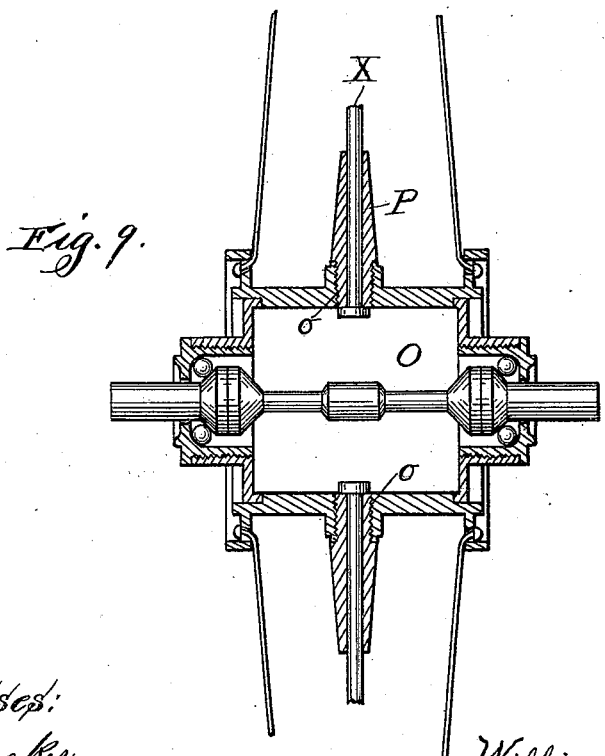
Witnesses:
R. J. Jacker,
S. E. Thomason.
Inventor:
William W. Rathbun
By Frank D. Thomason
Atty.
THE NORRIS PETERS CO., PHOTO-LITHO., WASHINGTON, D. C.

UNITED STATES PATENT OFFICE.

WILLIAM W. RATHBUN, OF CHICAGO, ILLINOIS.

WHEEL.

SPECIFICATION forming part of Letters Patent No. 649,176, dated May 8, 1900.

Application filed April 27, 1898. Serial No. 679,019. (No model.)

*To all whom it may concern:*

Be it known that I, WILLIAM W. RATHBUN, a citizen of the United States, and a resident of Chicago, Cook county, Illinois, have invented certain new and useful Improvements in Wheels, of which the following is a full, clear, and exact description, reference being had to the accompanying drawings and to the letters of reference marked thereon.

My invention relates more particularly to improvements in bicycle-wheels, although obviously adapted for wheels of other kinds of vehicles; and its object is to obtain the necessary resiliency and yield to the tread of the wheel without resorting to the use of pneumatic tires. By dispensing with the pneumatic tire the danger and inconvenience of punctures are avoided, and yet the ease and comfort due to their use are fully attained. This I accomplish by means of a flexible rim, radially-movable spokes, a concentric annular guide-rim, and the conjunctive mechanism used therewith, substantially as hereinafter fully described, and particularly pointed out in the claims.

In the drawings, Figure 1 is a side view of my invention. Fig. 2 is a transverse section taken on a radial plane through the outer or rim portion of the wheel. Fig. 3 is a side view of a segment of said wheel. Fig. 4 is a plan view of a section of the reinforcing metal facing of the outer ring of the annular guide. Fig. 5 is a perspective view of the section of the elastic rim of the wheel. Fig. 6 is a transverse section of the upper half of a wheel having a modified construction of my invention. Fig. 7 is a side view of a segment of the wheel shown in Fig. 6. Fig. 8 is a side view of a segment of a wheel embodying yet another modification of my invention, and Fig. 9 is a transverse section of the hub and central portion of the same.

Reference being had to the drawings, A represents the tire of my improved wheel, which may either be of the kind known as "solid" tires or "cushioned" tires, made of rubber or other suitable material.

B represents the elastic rim, and it consists of a flat band of suitable width made, preferably, of band-saw steel, having lugs *a a* projecting in an outwardly direction from each side edge thereof and arranged in pairs located opposite each other in the same transverse plane. These lugs are of such a length that they can be doubled back upon themselves, so that their end edges approach near each other at a point in front of and against the outer or convex side of the rim, and thus doubled are suitably curved so as to conform to the segment of the tire nearest the center of the wheel in order to provide a seat for and retain the same in position.

Rim B is preferably reinforced by a suitable supplemental wood rib *a*, secured to the inner circumference or concaved surface thereof, and by a supplemental strip of bandsaw steel or other suitable metal curved to the inner circumference of said wood rim *b*. This exact construction of the rim with its reinforcements, however, may be modified as desired, so long as it retains its elasticity.

D represents the hub, and *d* the spokes, of the wheel, which latter, as shown in the drawings, may be arranged tangentially or radially, as desired. Spokes *d* do not extend nor are they secured to the rim B, but are correspondingly shortened and secured to the metallic band E, secured flat against the outer circumference of the annular guide-rim F. A section of this band E is shown in Fig. 4, and it will be noticed that it is provided with laterally-projecting lugs *e*, which are arranged at equal intervals apart and alternately, first on one side and then the other of the band and to which said spokes are suitably secured. This annular guide-rim F may consist of a single rigid band of wood, as will hereinafter more fully appear; but I prefer to make the same of two parallel concentric bands of wood *f* and *g*, which are separated by spacing-sleeves G, arranged at equal distances apart, and are held together by tubular screws *h* and *i*, that pass through suitable openings in said bands *f* and *g* and have their screw-threaded ends engage the interiorly-screw-threaded ends of the said sleeve, alining with said openings. In order that this union of the two wooden bands may be satisfactorily made, it is necessary that one of these tubular screws *h* or *i* be provided with a right-hand screw-thread and the other with a left-hand screw-thread and the exterior of said sleeve be made of polygonal shape, so as to afford a grasp for a wrench or other device to turn it or tighten the same. The outer elastic rim of the wheel is connected with the guide-rim by radial rods I, which have their outer ends suitably secured in suitably-shaped nipples $k$. The inner portions of the shafts of these rods extend through the tubular screws $h\,i$, before referred to, and their inner ends nearest the center of the wheel extend through and terminate at a point just beyond the inner wooden band of the guide-rim and are swaged or headed, as shown.

In use the distance between the outer circumference of the rigid guide-rim and the elastic outer rim of the wheel is about an inch, and about the same distance separates the two wooden bands of which the guide-rim is composed. The radial rods are originally so adjusted by manipulating the nipples $k$ that their headed inner ends normally bear against the head of the inner tubular screw $h$.

In operation the weight on the wheel causes the supporting-segment of its elastic rim to give or bend upward as the wheel rolls along, and particularly when it passes over uneven surfaces or obstacles. This causes the radial rod or rods substantially in line with the point of ground-contact and the center of the wheel to move radially inward toward the center of revolution, and this to a corresponding extent causes the strain resulting from the circular displacement of the lowermost segment of said elastic rim to pull outward upon the portion of the same below the horizontal plane intersecting the center of the wheel.

In order to prevent debris getting under the head on the inner end of the radial reciprocal rods, I provide cup-shaped dust-caps $m$, which are screwed onto the screw-threaded edges of the head of the inner tubular screw $h$ and over the head of the rods and are of such length as to permit of the maximum reciprocal throw of the same.

In Fig. 6 I show a modified construction of my invention. The construction of the outer elastic rim A' of this modification is substantially the same as the rim hereinbefore described. The annular guide-rim F', however, is preferably made of a single band of solid or laminated wood and is held in position by tangentially or radially arranged spokes $d'$. The inner ends of these spokes are secured to the end flanges of the hub L of the wheel. This hub L is provided with a centrally-arranged circumferential web $l$, the outer circumferential edge of which is flanged laterally on each side, so that in cross-section it describes a T. Next its outer flanged edge this web is provided with a series of radially-elongated openings $m$, which correspond in number to and are in radial alinement with the radially-arranged reciprocal rods M. The outer ends of these rods M are adjustably secured by nipples J to the outer elastic rim A' in the same manner as are the radial rods I, hereinbefore alluded to, and the inner ends of these rods pass through suitable openings in the flanged edge of the said circumferential web $l$, which communicate with the elongated openings $m$ therein and are headed in any suitable manner, so as to prevent their removal. The guide-rim F' serves both as a brace and a guiding device for these radial rods M, which latter operate in substantially the same manner as the said radial rods I, excepting that they do not serve in any way to impart the strain due to the displacement of the outer rim, as it rolls over the ground, to the guide-rim, but throw such strain primarily wholly upon the hub of the wheel. If desired, the radial rods I of the wheel shown in the first five figures of the drawings could be used in conjunction with the radially-reciprocal rods M of the said modification, substantially as shown in dotted lines in Fig. 6 of the drawings.

In Fig. 8 I show yet another modification of my invention. This modification is substantially like that shown in Fig. 6, excepting that its inner end instead of terminating outside the hub extends through and terminates within the barrel of the same. In order to accomplish this, I provide the hub O with a series of circumferentially-arranged screw-threaded holes about its center of length and screw into each of these holes $o$ a corresponding series of nipples $p$, through which the inner ends of the radially-arranged reciprocal rods X pass. These rods X are substantially shown in Fig. 6, and their inner ends are headed, so as to prevent them moving outward through said nipples, which latter are preferably placed thereon before they are headed. By screwing the inner screw-threaded end of the nipple into the openings $o$ until their inner annular edges bear against the shoulder of the heads of the rods the circularity of the outer elastic rim is obtained. I prefer to provide each of these openings $o$ with a short outwardly-projecting stub, so as to afford a better purchase for the inner screw-threaded ends of said nipples.

The principal feature of my invention consists in its ability to utilize the elastic character of the rim itself to give resiliency to the wheel and to dispense with any other auxiliary device of an elastic or springy character in the accomplishment of this object. When the radially-reciprocal rods (no matter what their length may be) which connect the outer elastic rim to the remaining structure of the wheel are properly adjusted to give perfect circularity to said rim, the heads of the inner ends of said reciprocal rods should bear outward against the member or part of the wheel to which said inner ends connect. Thus a rigid wheel is insured at all times which will not possess any lateral displacement, and yet will provide that quality which will enable the wheel to neutralize the jar incident to irregular surfaces and obstacles over which it moves.

What I claim as new is—

1. The combination with the hub of a wheel, a rigid concentric guide-rim, and spokes connecting said hub and guide-rim, of a concentric endless outer elastic rim, a suitable tire therefor, and radially-arranged reciprocal rods, having their outer ends suitably rigidly secured to said elastic rim, and their inner ends extending through the guide-rim and provided with suitable heads, which normally bear outward against a concentrically-arranged circumferential surface within the circular plane of said guide-rim.

2. The combination with the hub of a wheel, a rigid concentric guide-rim, and spokes connecting said hub and guide-rim, of a concentric endless outer elastic rim, a suitable tire therefor, and short radially-disposed rods having their outer ends suitably rigidly secured to said elastic rim, and their inner ends extending through the guide-rim and provided with suitable heads which normally bear outwardly against the inner circumference of said guide-rim.

3. The combination with the hub of a wheel, a rigid concentric guide-rim consisting of two independent circular bands of suitable material arranged one within the circumferential plane of the other, and separably connected, and spokes connecting said guide-rim to said hub, of a concentric endless outer elastic rim, a suitable tire therefor, and short radially-disposed rods having their outer ends suitably rigidly secured to said elastic rim, and their inner ends extending through the guide-rim and provided with suitable heads which normally bear outwardly against the inner circumference of the innermost of the bands of said guide-rim.

4. The combination with the hub of a wheel, a rigid concentric guide-rim consisting of two independent circular bands of suitable material arranged one within the other which are separably connected by suitable spacing-sleeves having their ends provided respectively with right and left interior screw-threads, and a right and a left tubular screw extended through the bands of said rim and tapped into said sleeve, and spokes connecting said hub and guide-rim, of a concentric outer elastic rim, a suitable tire therefor, and short radially-disposed rods having their outer ends suitably secured to said elastic rim, and their inner ends extending through the guide-rim and provided with suitable heads which normally bear outward against the inner circumference of the innermost band of said guide-rim.

5. The combination with the hub of a wheel, a rigid concentric guide-rim consisting of two circular bands of suitable material arranged one within the other, and suitable spacing-sleeves separably connecting said bands, and having their ends provided respectively with a right and a left interior screw-thread, and right and left tubular screws extended through the bands of said guide-rim and tapped into said sleeve, and caps adjusted over the inner headed ends of the innermost tubular screw, together with spokes connecting said guide-rim and hub, of a concentric outer elastic rim, a suitable tire therefor, and short radially-disposed rods having their outer ends suitably secured to said elastic rim and their inner ends extending through the tubular screws and spacing-sleeve of the guide-rim, and provided with suitable heads which normally bear outward against the head of the innermost of said tubular screws.

6. The combination with the hub of a wheel, a rigid concentric guide-rim, a metallic reinforcing-band secured to the outer circumference of said guide-rim, having lugs projecting laterally therefrom, first from one side and then the other, and spokes having one end connected to said lugs and the other to said hub, of a concentric outer elastic rim, a suitable tire therefor, and radially-arranged reciprocal rods having their outer ends suitably secured to said elastic rim and their inner ends extending through the guide-rim and provided with suitable heads which normally bear outward against a concentrically-arranged circumferential surface within the circular plane of said guide-rim.

7. The combination with the hub of a wheel, a rigid concentric guide-rim, and spokes connecting said hub and guide-rim, of a concentric outer elastic rim made of suitable metal and having lugs projecting laterally from its side edges which are curved outwardly, a suitable tire surrounding said rims and retained in position by said lugs, and radially-arranged reciprocal rods having their outer ends suitably secured to said elastic rim and their inner ends extending through the guide-rim and provided with suitable heads which normally bear outward against a concentrically-arranged circumferential surface within the circular plane of said guide-rim.

8. The combination with the hub of a wheel, a rigid concentric guide-rim, and spokes connecting said hub and guide-rim, of a concentric outer elastic rim of suitable metal having lugs projecting laterally from its side edges at points opposite each other which are of such length that they can be doubled back upon themselves and curved outward, a suitable tire retained by said lugs against the outer circumference of said rim, and radially-arranged reciprocal rods having their outer ends suitably secured to said elastic rim and their inner ends extending through the guide-rim and provided with suitable heads which normally bear outward against the concentrically-arranged circumferential surface within the circular plane of said guide-rim.

9. The combination with the hub of a wheel, a rigid concentric guide-rim consisting of two bands of suitable material separably connected, of a concentric elastic rim having lugs projecting from its side edges at points opposite each other which are of such length that they can be doubled back onto themselves and curved outwardly, a circular layer of wood connected to the inner circumference of said elastic rim, a reinforcing metallic band secured to the inner circumference of said layer of wood, and a series of radially-arranged reciprocal rods having their outer ends suitably secured to said elastic rim, and their inner ends extended through the guide-rim, and provided with suitable heads which normally bear outward against the inner circumference of said guide-rim.

10. The combination with the hub of a wheel, a rigid concentric guide-rim, and spokes connecting the said hub and guide-rim, of a concentric outer elastic rim of suitable metal having lugs projecting laterally from its side edges at points opposite each other which are doubled back upon themselves and curved outward, a layer of wood secured to the inner circumference of said elastic rim and a reinforcing metallic band secured to the inner circumference of said layer of wood, a suitable tire held in position against the outer circumference of said elastic rim by said lugs, and radially-arranged rods having their outer ends suitably secured to said elastic rim and their inner ends extended through the guide-rim and provided with suitable heads which normally bear outward against the inner circumference of said guide-rim.

Signed by me this 28th day of March, 1898, at Chicago, Cook county, Illinois.

WILLIAM W. RATHBUN.

Witnesses:
SAMUEL DESPRES,
FRANK D. THOMASON.